(12) United States Patent
Hariyani et al.

(10) Patent No.: US 11,303,807 B2
(45) Date of Patent: Apr. 12, 2022

(54) USING REAL TIME RAY TRACING FOR LENS REMAPPING

(71) Applicant: TEXAS INSTRUMENTS INCORPORATED, Dallas, TX (US)

(72) Inventors: Hemant Vijay Kumar Hariyani, Plano, TX (US); Martin Fritz Mueller, Allen, TX (US); Vikram Vijayanbabu Appia, San Jose, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/361,433

(22) Filed: Jun. 29, 2021

(65) Prior Publication Data

US 2021/0329169 A1 Oct. 21, 2021

Related U.S. Application Data

(63) Continuation of application No. 16/290,855, filed on Mar. 1, 2019, now Pat. No. 11,050,932.

(51) Int. Cl.
*H04N 5/232* (2006.01)
*G02B 13/06* (2006.01)
*B60R 11/04* (2006.01)
*G06T 15/06* (2011.01)

(52) U.S. Cl.
CPC .......... *H04N 5/23238* (2013.01); *B60R 11/04* (2013.01); *G02B 13/06* (2013.01); *G06T 15/06* (2013.01); *H04N 5/23229* (2013.01)

(58) Field of Classification Search
CPC ........... H04N 5/23238; H04N 5/23229; H04N 5/23293; H04N 5/247; H04N 17/002; H04N 7/181; B60R 11/04; B60R 1/00; B60R 2300/402; B60R 2300/102; B60R 2300/105; B60R 2300/202; B60R 2300/306; B60R 2300/802; G02B 13/06; G06T 15/06; G06T 15/205; G06T 3/0093; G06T 19/20; G06T 17/20; G06T 7/0018; G06T 2207/30252; G06K 9/00791;
(Continued)

(56) References Cited

U.S. PATENT DOCUMENTS

| 5,185,667 A | 2/1993 | Zimmermann |
| 6,990,228 B1 * | 1/2006 | Wiles ...................... G06T 17/10 345/419 |
| 10,410,328 B1 | 9/2019 | Liu et al. |

(Continued)

OTHER PUBLICATIONS

Vikram Appia et al., "Surround View Camera System for ADAS on TI's TDAx SoCs", Texas Instruments, SPRY270A, Oct. 2015, pp. 1-18.
(Continued)

*Primary Examiner* — Pritham D Prabhakher
(74) *Attorney, Agent, or Firm* — Brian D. Graham; Charles A. Brill; Frank D. Cimino

(57) ABSTRACT

A method for generating a surround view (SV) image for display in a view port of an SV processing system is provided that includes capturing, by at least one processor, corresponding images of video streams from each camera of a plurality of cameras and generating, by the at least one processor, the SV image using ray tracing for lens remapping to identify coordinates of pixels in the images corresponding to pixels in the SV image.

20 Claims, 6 Drawing Sheets

(58) Field of Classification Search
CPC ......... G06K 9/3216; G06K 2009/2045; G06K 2009/3225
USPC ...................................................... 348/218.1
See application file for complete search history.

(56) References Cited

U.S. PATENT DOCUMENTS

| | | | |
|---|---|---|---|
| 10,460,511 B2* | 10/2019 | Ondruska | G06T 15/20 |
| 10,523,865 B2 | 12/2019 | Appia et al. | |
| 10,565,867 B2* | 2/2020 | Alon | G06T 7/20 |
| 10,657,391 B2* | 5/2020 | Chen | G06K 9/00798 |
| 10,916,035 B1* | 2/2021 | Kroeger | G06K 9/4604 |
| 10,997,433 B2* | 5/2021 | Xu | G06K 9/00718 |
| 11,042,163 B2* | 6/2021 | Chen | B60W 30/18154 |
| 2008/0298674 A1 | 12/2008 | Baker et al. | |
| 2009/0087013 A1 | 4/2009 | Westrick | |
| 2014/0104424 A1 | 4/2014 | Zhang et al. | |
| 2014/0111637 A1 | 4/2014 | Zhang et al. | |
| 2014/0114534 A1* | 4/2014 | Zhang | H04N 5/23238 701/42 |
| 2016/0098815 A1 | 4/2016 | Zhang et al. | |
| 2016/0209647 A1 | 7/2016 | Fursich | |
| 2016/0241791 A1* | 8/2016 | Narayanswamy | G06T 15/00 |
| 2016/0314564 A1 | 10/2016 | Jones et al. | |
| 2016/0360104 A1 | 12/2016 | Zhang et al. | |
| 2017/0195564 A1 | 7/2017 | Appia et al. | |
| 2017/0206415 A1 | 7/2017 | Redden | |
| 2017/0359561 A1 | 12/2017 | Vallespi-Gonzalez | |
| 2018/0089888 A1* | 3/2018 | Ondruska | G06T 7/55 |
| 2018/0150994 A1 | 5/2018 | Foutzitzis et al. | |
| 2018/0184078 A1 | 6/2018 | Shivalingappa et al. | |
| 2019/0116352 A1* | 4/2019 | Pesonen | H04N 13/15 |
| 2019/0212749 A1* | 7/2019 | Chen | B60W 30/18154 |
| 2019/0213426 A1* | 7/2019 | Chen | G06T 7/20 |
| 2019/0258251 A1* | 8/2019 | Ditty | G06K 9/00805 |
| 2019/0266418 A1* | 8/2019 | Xu | G06K 9/4604 |
| 2019/0349571 A1 | 11/2019 | Herman et al. | |
| 2020/0011668 A1* | 1/2020 | Derhy | G01C 21/206 |
| 2020/0218910 A1 | 7/2020 | Herman | |
| 2021/0006806 A1* | 1/2021 | Schwarz | G06T 9/001 |

OTHER PUBLICATIONS

Paul Rademacher, "Ray Tracing: Graphics for the Masses", Crossroads: the ACM Student Magazine, vol. 3, Issue 4, May 1997, pp. 3-7.

"PowerVR Ray Tracing", Imagination, available at https://www.imgtec.com/legacy-gpu-cores/ray-tracing/ on Jul. 10, 2018, pp. 1-3.

"Ray tracing (graphics)", Wikipedia, available at https://en.wikipedia.org/wiki/Ray_tracing (graphics) on Aug. 24, 2018, pp. 1-10.

"Ray-Tracing: Generating Camera Rays", Scratchapixel 2.0, available at https://www.scratchapixel.com/lessons/3d-basic-rendering/ray-tracing-generating-camera-rays/generating-camera-rays on Aug. 24, 2018, pp. 1-12.

"Ray-Tracing: Generating Camera Rays", Scratchapixel 2.0, available at https://www.scratchapixel.com/lessons/3d-basic-rendering/ray-tracing-generating-camera-rays/definition-ray on Aug. 24, 2018, pp. 1-6.

"Ray-Tracing: Generating Camera Rays", Scratchapixel 2.0, available at https://www.scratchapixel.com/lessons/3d-basic-rendering/ray-tracing-generating-camera-rays/standard-coordinate-systems on Aug. 24, 2018, pp. 1-5.

International Search Report for PCT/US2020/020600 dated May 28, 2020.

* cited by examiner

USING REAL TIME RAY TRACING FOR LENS REMAPPING

CROSS-REFERENCE TO RELATED APPLICATIONS

This application is a continuation of U.S. patent application Ser. No. 16/290,855, filed Mar. 1, 2019, which is incorporated by reference herein in its entirety.

BACKGROUND

The automotive surround view (SV) camera system is an emerging technology in the advanced driver assistance systems (ADAS) market space. While originally used to assist the driver of a vehicle in parking the vehicle safely by presenting the driver with a top-down view of the 360 degree surroundings of the vehicle, automotive SV camera systems are increasingly being deployed as part of autonomous driving and autonomous parking. An automotive SV camera system may include four or more wide-angle (fish-eye lens) cameras mounted around the vehicle, each facing a different direction. From these camera inputs, a composite view of the surroundings of the vehicle is synthesized.

Some three-dimensional (3D) SV camera systems use raster processing supported by a graphics processing unit (GPU) to render views of the 3D scene around a vehicle. As the complexity of surround view implementations increases due to demand for features such as adaptive depth, split screen views and realistic reflections, exponential scaling of GPU resources is desirable to achieve the desired performance.

SUMMARY

Embodiments of the present disclosure relate to methods and systems for lens remapping using real-time ray tracing. In one aspect, a method for generating a surround view (SV) image for display in a view port of an SV processing system is provided that includes capturing, by at least one processor, corresponding images of video streams from each camera of a plurality of cameras and generating, by the at least on processor, the SV image using ray tracing for lens remapping to identify coordinates of pixels in the images corresponding to pixels in the SV image.

In one aspect, a surround view (SV) processing system is provided that includes a plurality of cameras, a display device, at least one processor coupled to the plurality of cameras and to the display device, and a non-transitory computer readable storage medium storing a program for execution by the at least one processor, the program including instructions to capture corresponding images of video streams from each camera of the plurality of cameras, and to generate the SV image using ray tracing for lens remapping to identify coordinates of pixels in the images corresponding to pixels in the SV image.

In one aspect, a method for lens remapping to determine a value of a pixel in a view port is provided that includes casting, by at least one processor, a first ray from a viewpoint through a location of the pixel in the view port into a model of a scene, casting, by the at least on processor, a second ray from an intersection point of the first ray in the model to a center of a lens model having the intersection point in a field of view of a lens corresponding to the lens model, and determining, by the at least one processor, the value of the pixel based on an intersection point on the lens model of the second ray.

In one aspect, a vehicle is provided that includes a surround view (SV) processing system. The SV processing system includes a plurality of cameras mounted on the vehicle, where adjacent cameras have overlapping fields of view, a display device, a ray-tracing enabled graphics processing unit (GPU), at least one processor coupled to the plurality of cameras, the display device, and the GPU, and a non-transitory computer readable medium storing a program for execution by the at least one processor and the GPU, the program including instructions to capture corresponding images of video streams from each camera of the plurality of cameras, and to generate an SV image using ray tracing for lens remapping to identify coordinates of pixels in the images corresponding to pixels in the SV image, where the GPU performs the ray tracing using hemispheric lens models corresponding to respective cameras of the plurality of cameras, and a processor coupled to the memory to execute the software instructions.

In one aspect, a method for generating a surround view (SV) image for display in a view port of an SV processing system included in a vehicle is provided that includes capturing corresponding images of video streams from each camera of a plurality of cameras mounted on the vehicle, where adjacent cameras have overlapping fields of view, and generating the SV image using ray tracing for lens remapping to identify coordinates of pixels in the images corresponding to pixels in the SV image, where a ray-tracing enabled graphics processing unit (GPU) contained in the SV processing system performs the ray tracing using hemispheric lens models corresponding to respective cameras of the plurality of cameras.

DETAILED DESCRIPTION

Figure 1:
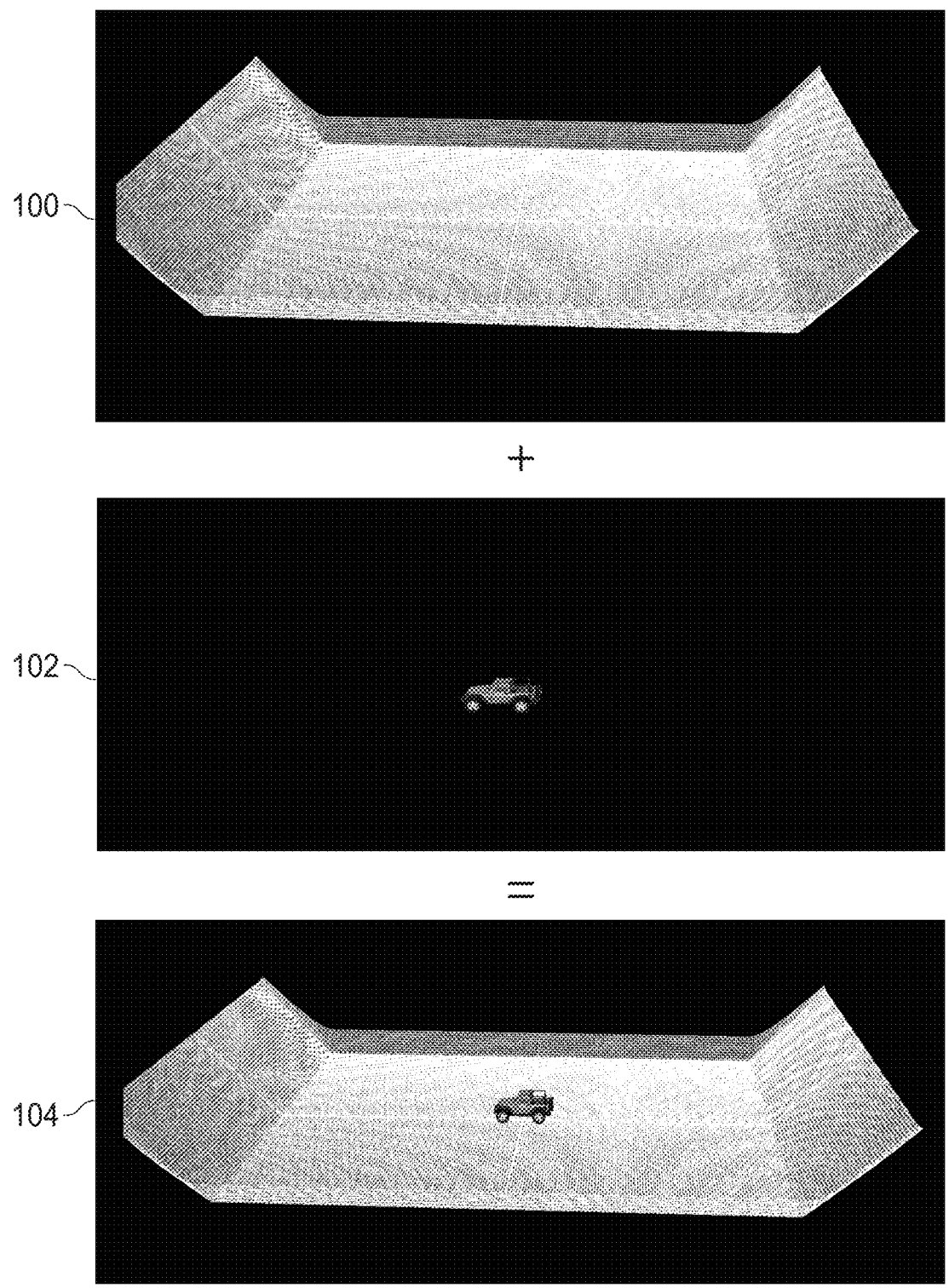
FIG. 1 is an example illustrating a model for raster processing of three-dimensional (3D) surround view (SV) images.

Specific embodiments of the invention will now be described in detail with reference to the accompanying figures. Like elements in the various figures are denoted by like reference numerals for consistency.

In a three-dimensional (3D) automotive surround view (SV) camera system, the 3D surround view image of the surroundings of a vehicle is achieved by capturing video streams from multiple cameras mounted on the periphery of the vehicle and "stitching" the video streams together. Cameras with a wide field of view, e.g., equipped with a fish-eye lens, are used to achieve overlap in the video captured by adjacent cameras. The overlap is critical for a high quality stitched output.

As previously mentioned, raster processing supported by a graphics processing unit (GPU) can be used to render views of the 3D scene around a vehicle. In raster processing based solutions, a scene is defined in 3D world coordinate space and objects in the scene are defined using 3D vertices. To generate a 3D SV image from the desired viewpoint or eye position, a model, a view, and projection matrices are used to transform each 3D vertex of objects in the scene from world space to eye space and to project the transformed vertices to screen space. Once in screen space, rasterization is performed to fill in lines/solids between the vertices and to shade each pixel to determine each pixel value.

Many implementations render the camera images to a 3D mesh representing the world around the vehicle. As illustrated in the example of FIG. 1, for raster processing of 3D SV images, a bowl-shaped 3D mesh 100 representing the world around the vehicle is generated. The regions of the world near the vehicle lie on the flat surface of the bowl, representing the ground, and the regions farther from the vehicle, representing objects, lie on the elevated surface of the bowl. A 3D model of the vehicle 102 is created and overlaid onto the bowl mesh 104.

To render a 3D SV image from four cameras using a GPU, pixel coordinates corresponding to each 3D vertex on the bowl mesh are calculated from at least two cameras. Calculating the pixel coordinates for a camera includes projecting each 3D vertex onto the camera plane to determine the two-dimensional (2D) image plane coordinates and performing lens remapping to determine camera sensor pixel coordinates from the image plane coordinates. The lens remapping uses a lookup table provided by the lens manufacturer to remap image pixel locations from an undistorted image plane to the actual image plane. For fully adaptive surround view, these computations are performed for every vertex of the bowl mesh for every input image. Such processing is a limiting factor for raster-based GPUs as the processing can consume several GPU cycles per vertex and the number of vertices in a bowl mesh can be on the order of 500,000 or more. In addition, 500,000 or more vertices of the vehicle model need to be transformed for every image.

Embodiments of the disclosure provide for using real time ray tracing for lens remapping in applications that generate 3D images using wide angle cameras such as, for example, a 3D automotive SV camera system. The use of ray tracing moves two of the most computationally expensive operations in raster-based processing—the projection of a world point onto the camera plane and the lens remapping—out of the per image rendering loop. These operations can instead be performed once offline as part of a calibration process and the results are constant unless the cameras are changed or moved. Further, the use of ray tracing for lens remapping in 3D SV systems can reduce the complexity and increase performance as compared to raster processing for use cases such as complex car models, multiple viewpoints, changing depths in a scene, and displaying reflections and shadows.

Figure 2:
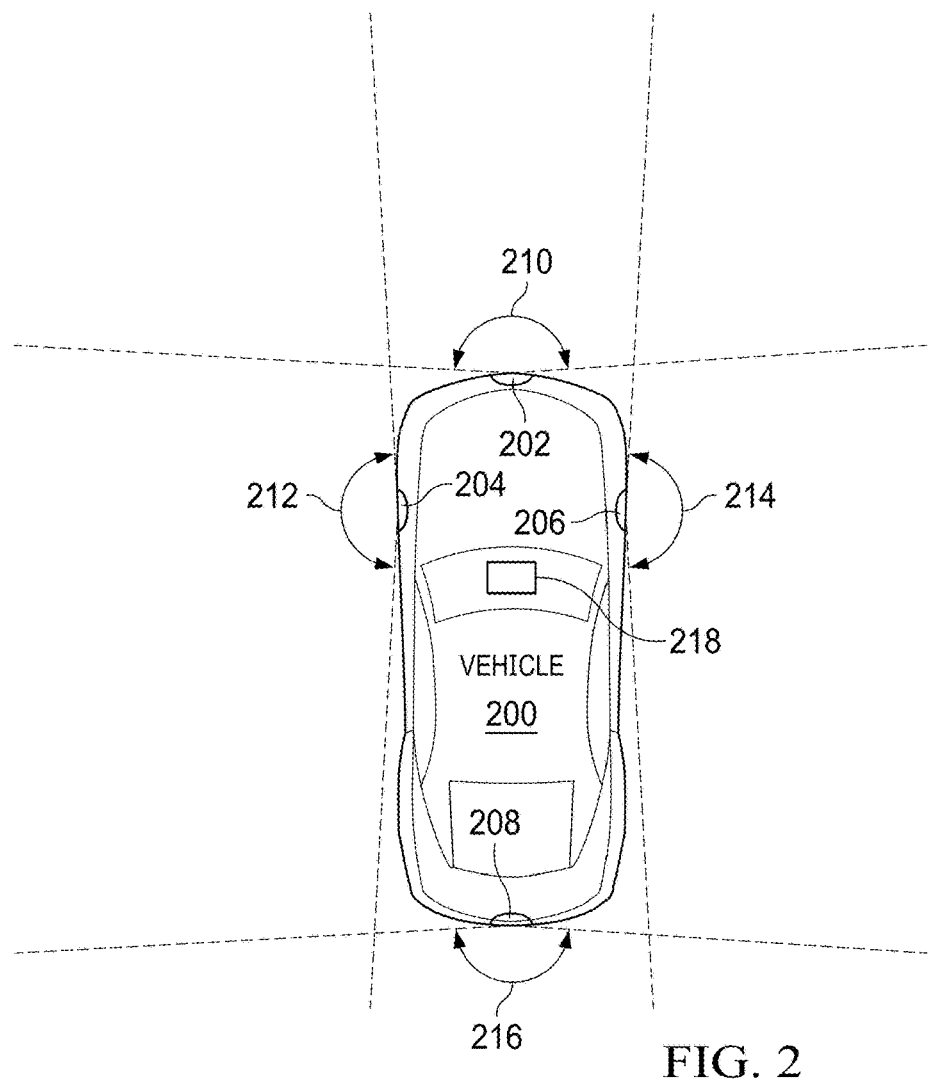
FIG. 2 is a top-down view of an example vehicle 200 that includes a 3D automotive SV camera system.

FIG. 2 is a top-down view of an example vehicle 200 that includes a 3D automotive SV camera system. The vehicle 200 includes four cameras 202, 204, 206, 208 with wide angle lenses mounted at different points on the vehicle 200 and an SV processing system (not specifically shown) coupled to the four cameras. Each camera is placed to have at least a 180 degree field of view (FOV). The SV processing system includes hardware and software to receive video streams captured by the cameras 202, 204, 206, 208 and to process the video streams to generate 3D SV images. The processing includes using ray tracing for lens remapping to determine the values of the pixels to be displayed in the 3D SV images. The vehicle 200 also includes a 3D display device 218 in the interior of the vehicle 200 that is coupled to the SV processing system to display 3D SV images produced by the SV processing system.

The camera 202 is mounted on the front of the vehicle 200, e.g., on the grille, the cameras 204 and 206 are mounted on opposite sides of the vehicle 200, e.g., on the side-view mirrors, and the camera 208 is mounted on the rear of the vehicle 200, e.g., on the trunk door. The cameras 202, 204, 206, 208 are positioned such that each has a respective field of view (FOV) angle 210, 212, 214, 216 and the FOVs of adjacent camera pairs overlap to some degree, e.g., approximately 90 degrees.

Figure 3:
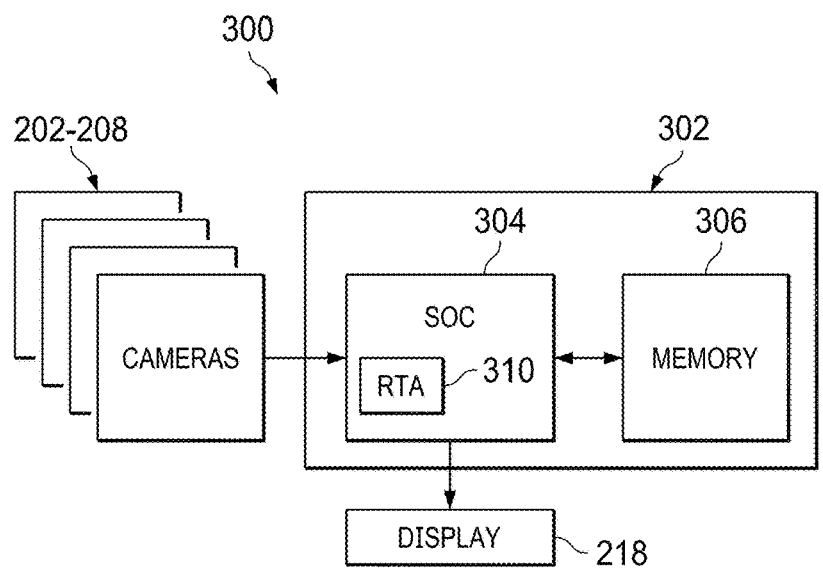
FIG. 3 is a block diagram of an embodiment of the automotive SV camera system included in the vehicle of FIG. 2.

FIG. 3 is a block diagram of an embodiment of the automotive SV camera system 300 included in the vehicle 200 of FIG. 2. The automotive SV camera system 300 includes the cameras 202-208, the display device 218, and the aforementioned SV processing system 302 coupled to the cameras and the display device. The SV processing system 302 includes a system-on-a-chip (SOC) 304 coupled to the cameras 202-208 and the display device 218 and to a memory 306. The memory 306, e.g., a non-transitory computer readable storage medium, may be any suitable combination of memory technologies such as, for example, random access memory, read-only memory, and/or flash memory. The memory 306 stores executable software instructions of the SV processing system 302 to be executed on one or more processors of the SOC 304. The executable software instructions include instructions implementing an embodiment of the method for generation of an SV image using ray. In some embodiments, the software instructions include instructions implementing an embodiment of the calibration process described herein.

The SOC 304 may be any SOC suitable for real-time 3D SV image generation. The SOC 304 includes a ray tracing accelerator (RTA) 310 capable of real-time ray tracing. The RTA 310 can be, for example, a ray-tracing enabled GPU or a programmable processor, e.g., a digital signal processor, capable of executing ray tracing software with the required performance.

Prior to deployment or when maintenance is needed, the automotive SV camera system 300 is calibrated using geometric calibration charts to provide for proper integration of the images captured by the multiple cameras 202-208. One input to the calibration process is a world model suitable for ray tracing to generate the SV images. The world is empirically modelled as a 3D mesh and can be any suitable shape with any suitable spacing of the mesh vertices. In some embodiments, the world around the vehicle 200 is represented by a 3D bowl mesh (see, e.g., FIG. 1) in which regions near the vehicle 200 lie on the flat region of the bowl and regions farther away from the vehicle 200 lie on an elevated surface of the bowl. The vertices of the mesh are defined assuming the center of the mesh is at 0, 0, 0 with the distance between neighboring points being one unit in the x and y direction. The size of the unit is empirically selected. The value of z remains zero for some empirically determined distance and a linear function is used to give the bowl some height near the edges. The linear function is determined empirically. The world model is stored as a table of vertices.

As part of the calibration process, a model of the vehicle 200 and lens models for the cameras 202-208 are incorporated in the world model. In some embodiments, the lens models are hemispheric lens models that are generated using the intrinsic parameters of the respective cameras 204-210 and each model is represented as a set of vertices that define the hemisphere. Each vertex of the hemisphere is represented by an x,y,x value in lens model space and camera image coordinates u, v corresponding to the particular vertex. Generation of the lens models is described in more detail below. The vehicle model is a 3D model represented as a table of vertices along with attributes such the normal or orientation of the vehicle model, a texture map for adding color, texture, or other surface detail to the vehicle model, etc. With appropriate camera configuration, every location on the bowl mesh can be mapped to one camera or two adjacent cameras on the vehicle 200. The center of the vehicle is placed at location 0, 0, 0 of the world model and the lens models are placed at the corresponding x, y, z location in world space based on the respective extrinsic parameters as described below.

Figure 4:
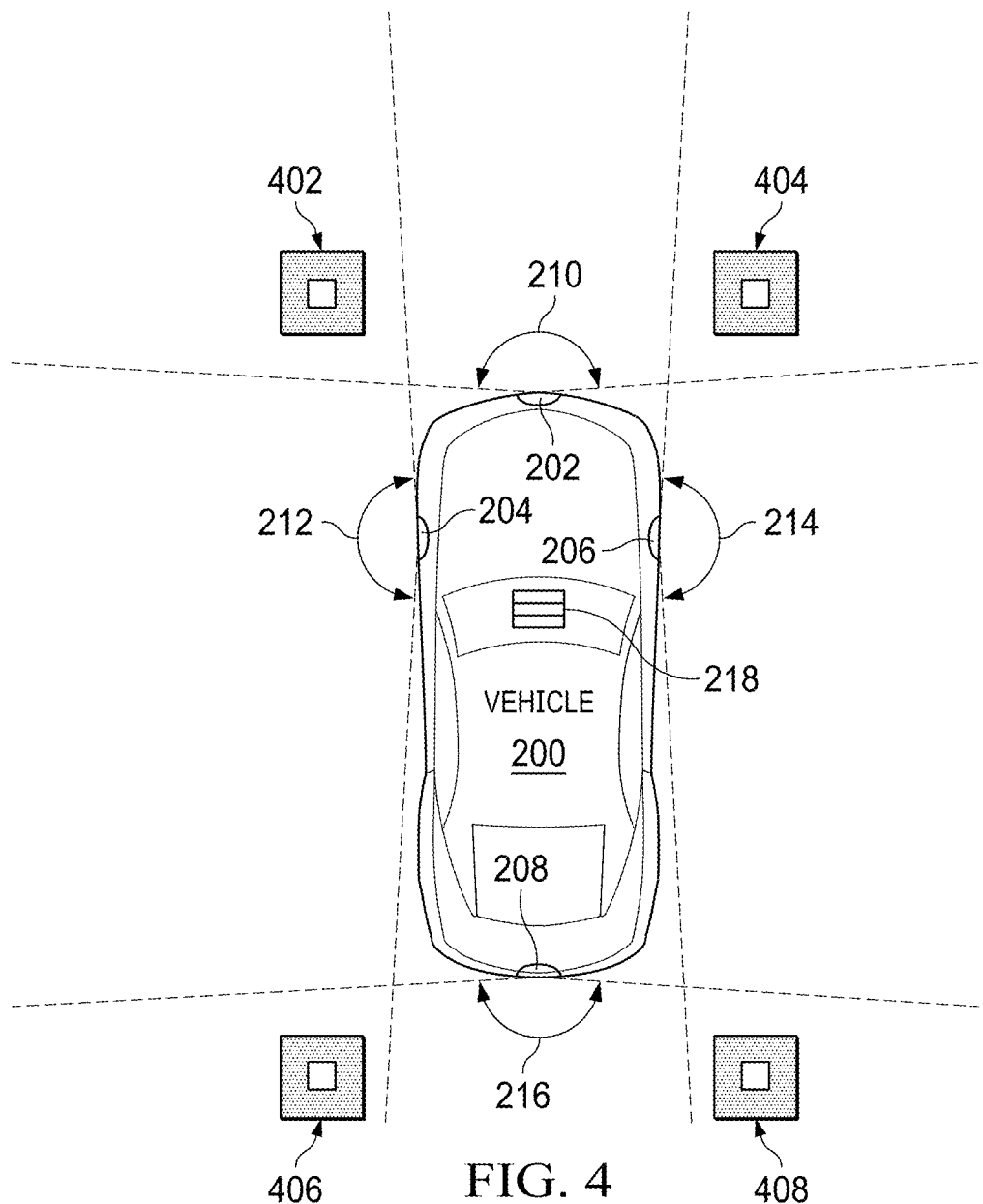
FIG. 4 depicts an example arrangement of four calibration charts around the vehicle of FIG. 2.

Without proper calibration and model generation, the SV images produced by the system 300 may be inaccurate. FIG. 4 depicts an example arrangement of four calibration charts 402, 404, 406, 408 around the vehicle 200 of FIG. 2 to be used by the calibration process. The four calibration charts are positioned such that images of each chart can be simultaneously captured by two adjacent cameras. For example, images of the calibration chart 402 can be simultaneously captured by the camera 202 and the camera 204, and images of the calibration chart 404 can be simultaneously captured by the camera 202 and the camera 206. Further, images of the calibration chart 408 can be simultaneously captured by the camera 206 and the camera 208, and images of the calibration chart 406 can be simultaneously captured by the camera 208 and the camera 204.

Figure 5:
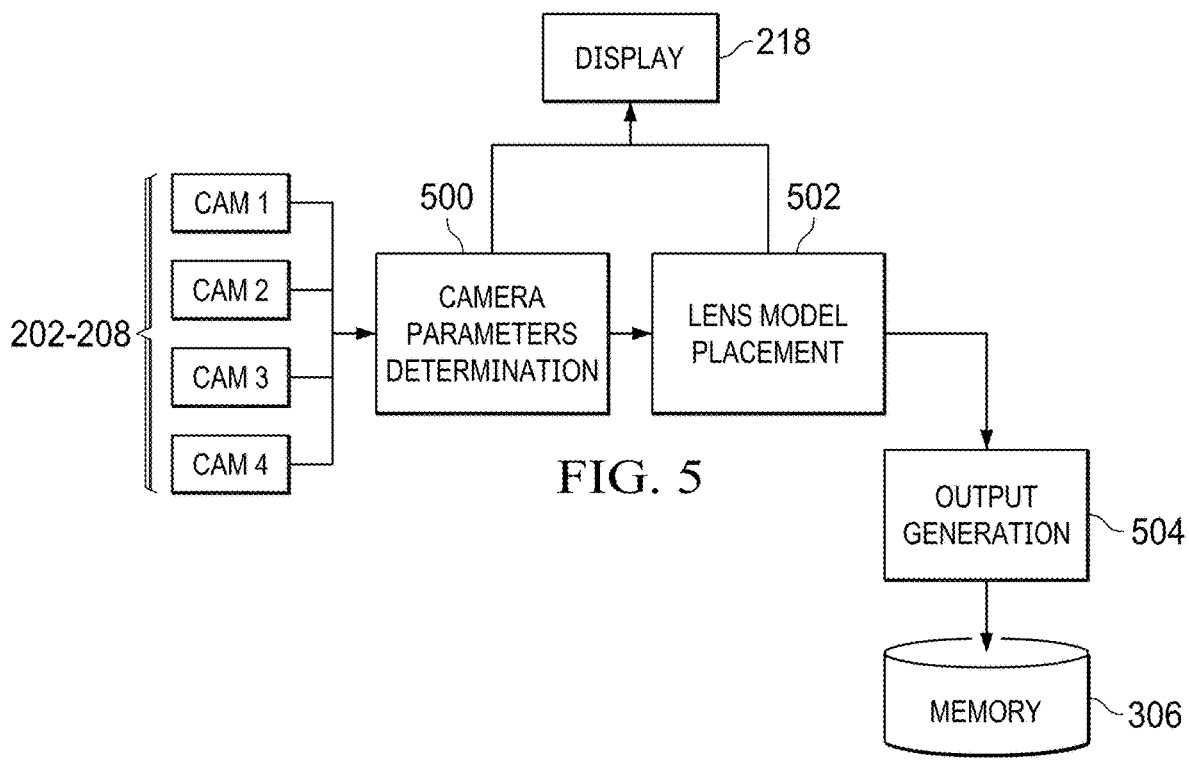
FIG. 5 is a block diagram of a calibration process implemented by the automotive SV camera system of FIG. 3.

FIG. 5 is a block diagram of a calibration process implemented by the SV camera system 300 of FIG. 3. The components of the calibration process include the camera parameters determination component 500, the lens model placement component 502, and the output generation component 504. Where the particular components 500, 502, 504 are executed is implementation dependent. In some embodiments, the camera parameters determination component 500 is executed on a digital signal processor and the lens model placement component 502 and the output generation component 506 are executed on a general purpose processor.

The memory 306 stores the predetermined platform dependent parameters used during the calibration process which include the sizes of the calibration charts 402, 404, 406, 408, the locations of the charts relative to each other, etc. In various embodiments, some combination of other platform dependent parameters may also be stored in the memory 306, e.g., the number of cameras, lens specific intrinsic parameters, the vehicle model, the world model, the lens models, etc. During the calibration process, a calibration screen is displayed on display device 216 that includes the video streams from the four cameras 202-208.

The camera parameters determination component 500 determines the extrinsic parameters of each of the four cameras 202-208 based on the calibration charts in the displayed video streams. More specifically, the camera parameters determination component 500 determines a rotation matrix and a translation matrix for each camera. Any suitable technique can be used to generate these matrices. Examples of some suitable techniques are described in United States Patent Application Publication No. 2018/0184078, filed Dec. 28, 2016, which is incorporated by reference herein in its entirety.

The lens model placement component 502 places the lens models around the 3D model of the vehicle 200 overlaid on the world model using the extrinsic parameters, e.g., location and orientation with respect to the center of the world model or the vehicle 200, of the respective cameras 204-210. To convert each lens model to the world space, each vertex in the model is multiplied by the model matrix for the respective lens.

The output generation component 504 performs any final processing needed to convert the various models into formats needed for generation of SV images during operation of the SV camera system 300 and stores the results in the memory 306.

As previously mentioned, in some embodiments, the lens models for the cameras 202-208 are hemispheric lens models. Each hemispheric lens model is generated using the intrinsic parameters of the respective camera 202-208. Camera intrinsic parameters are fixed per camera and are provided by the camera manufacturer. The intrinsic parameters include the lens focal length and the lens distortion model. In general, to generate a hemispheric lens model for a lens, the vertex of each point on a hemisphere is projected onto the image plane of the corresponding camera and a lens distortion lookup table provided by the camera/lens manufacturer is used to assign the projected vertex to lens coordinates corresponding to the camera image. The resulting lens model is a set of vertices that defines the hemisphere in which each vertex of the hemisphere is represented by an x,y,x value in lens model space and camera image coordinates u, v corresponding to the particular vertex.

The calculations to determine the lens coordinates for the vertices are performed in local lens model space with the origin at the center of the image plane. A unit hemisphere (r=1) can be used. The number of points on the hemisphere depends on factors such as pixel resolution of the lens, pixel resolution of the target display device, e.g., display device 218, and interpolation accuracy. Further, the number of points on the hemisphere should be sufficiently dense to not affect the quality of the output used to generate the SV images.

Figure 6:
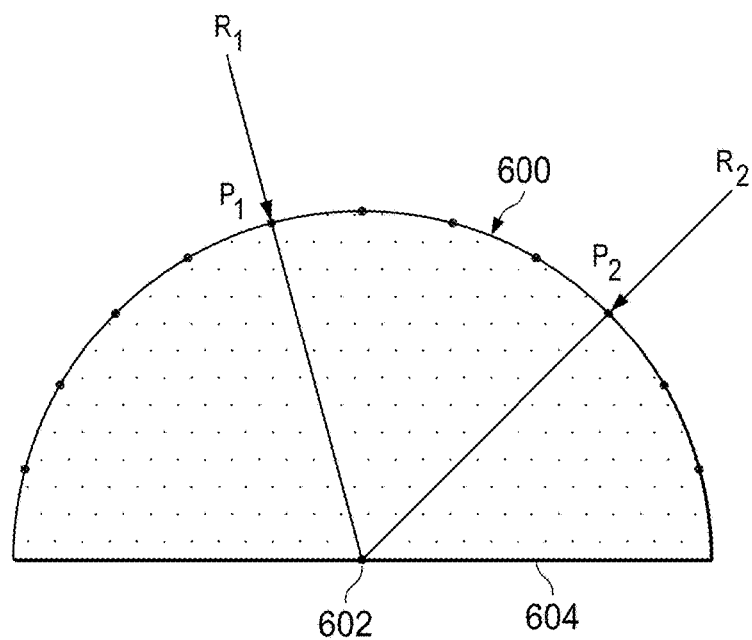
FIG. 6 is an example illustrating mapping of hemispheric lens model vertices to lens coordinates.

FIG. 6 is an example illustrating mapping of hemispheric lens model vertices to lens coordinates. As is explained in more detail in reference to FIG. 7, each point or vertex, e.g., $P_1$ and $P_2$, on the hemispheric lens model surface 600 is mapped to lens (image) coordinates by mathematically projecting each vertex toward the lens surface 604, also referred to as the sensor plane, and determining the image coordinates x, y of the intersection point with the lens surface. This mapping corresponds to the intersection of a ray with the lens model surface 604 when the ray is cast through the vertex toward the center 602 of the lens. For example, the ray R1 is cast toward the center 602 of the lens surface 604 and intersects the model surface 600 at vertex P1 and the ray R2 is cast toward the center 602 of the lens surface 604 and intersects the model surface 600 at vertex P2. The ray arrows denote the direction of casting and not the actual intersection points. The lens (image) coordinates mapped to the respective vertices P1, P2 identify the locations of respective image pixels where the rays intersect with the lens surface 604.

Figure 7:
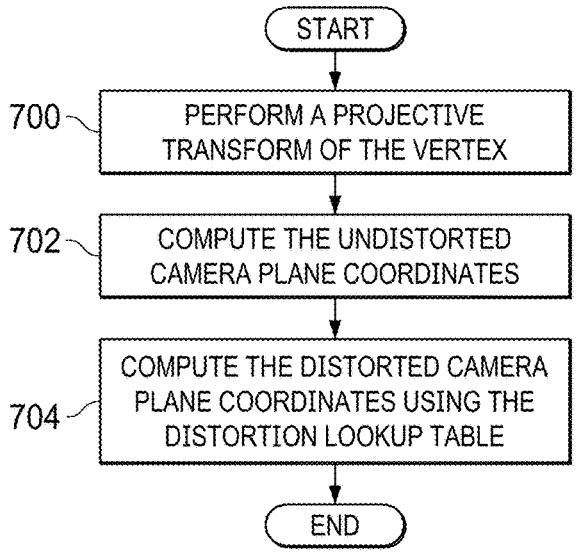
FIG. 7 is a flow diagram of a method for determining a lens coordinate for a vertex on a hemispheric lens model.

FIG. 7 is a flow diagram of a method for determining a lens coordinate for a vertex on a hemispheric model. The method can be used to determine the lens coordinates for each vertex of the hemispheric lens models for the cameras 202-208. The method can be performed on any suitably configured computer. The input to the method is a vector [x, y, z, w], referred to as yin herein, where x, y, z are the coordinates of a vertex on surface of the hemisphere and w=1.0. The x, y, z coordinates are with respect to the center of the hemisphere positioned at the camera lens center with the "up" direction being from the origin toward the top of the sensor on the sensor plane.

Initially, a projective transform is performed 700 on the vertex coordinates yin to project the vertex onto the sensor plane. The projective transform is performed as per vOut=mP*yIn, where mP is a projection matrix based on the camera intrinsic parameters. The undistorted sensor plane coordinates xu and yu corresponding to the projected vertex are then computed 702 as per xu=vOut.x/vInz and yu=vOut.y/vInz.

The actual distorted sensor plane coordinates xd and yd corresponding to the projected vertex are then computed 704 using the lens distortion lookup table. In some embodiments, the lookup table is defined as a function of the angle θu between the normal of the camera and a vector from a point along the normal (called the focal length of the lens) to the radial distance (ru) between the origin and the undistorted image plane coordinates xu and yu. The output of the lookup operation is the radial distance (rd) between the origin and the corresponding point on the sensor in the distorted domain.

First, the radial distance in the undistorted domain ru from the center of the sensor to xu, yu is computed as per ru=length (xu, yu). The angle θu is then calculated as per θu=arctan(ru*fl), where fl is the focal length of the lens. The value of rd is then determined from the lookup table using θu as the index into the table. Finally, xd and yd are computed as per xd=(rd/ru)*xu and yd=(rd/ru)*yu. Note that these coordinates are offsets from the center of the image while the origin of pixel coordinates of the sensor is the upper left corner. Actual coordinates need to be calculated using the lens resolution and coordinates of the center of the lens.

Figure 8:
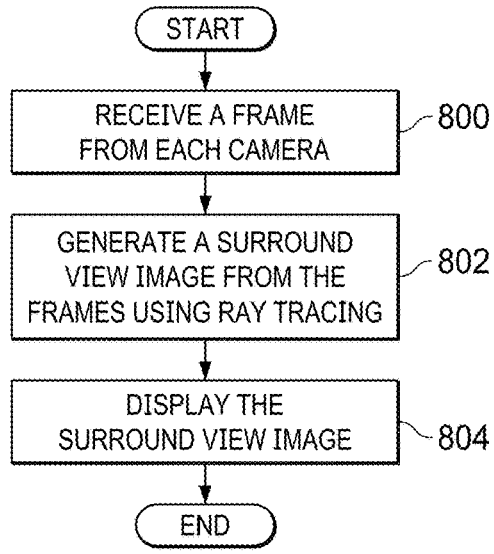
FIG. 8 is a flow diagram of a method for generating an SV image using ray tracing.

FIG. 8 is a flow diagram of a method for generating an SV image for display in a view port that can be performed by the SV camera system 300 of FIG. 3. The method uses ray tracing for lens remapping as part of generating the SV image to be displayed in the view port, also referred to as an output window, of the display device 218. The use of ray tracing enables real time performance of dynamic and adaptive surround view where camera orientation and location in a scene can change or the scene itself can change. Moreover, unlike raster processing in which each vertex needs to be processed for each viewpoint change, the use of ray tracing eliminates the need to process each vertex when the scene changes.

A view port can be the entire display screen 218 or a rectangular subset thereof. Further, a view port can be any resolution supported by the display device 218. The method assumes world model data generated as previously described herein is stored in the memory 306 for use in ray tracing. The method also assumes that a viewpoint, also referred to as an eyepoint, for the view port is specified. Any arbitrary viewpoint can be specified, e.g., by a user operating a vehicle including the SV camera system 300.

Figure 9:
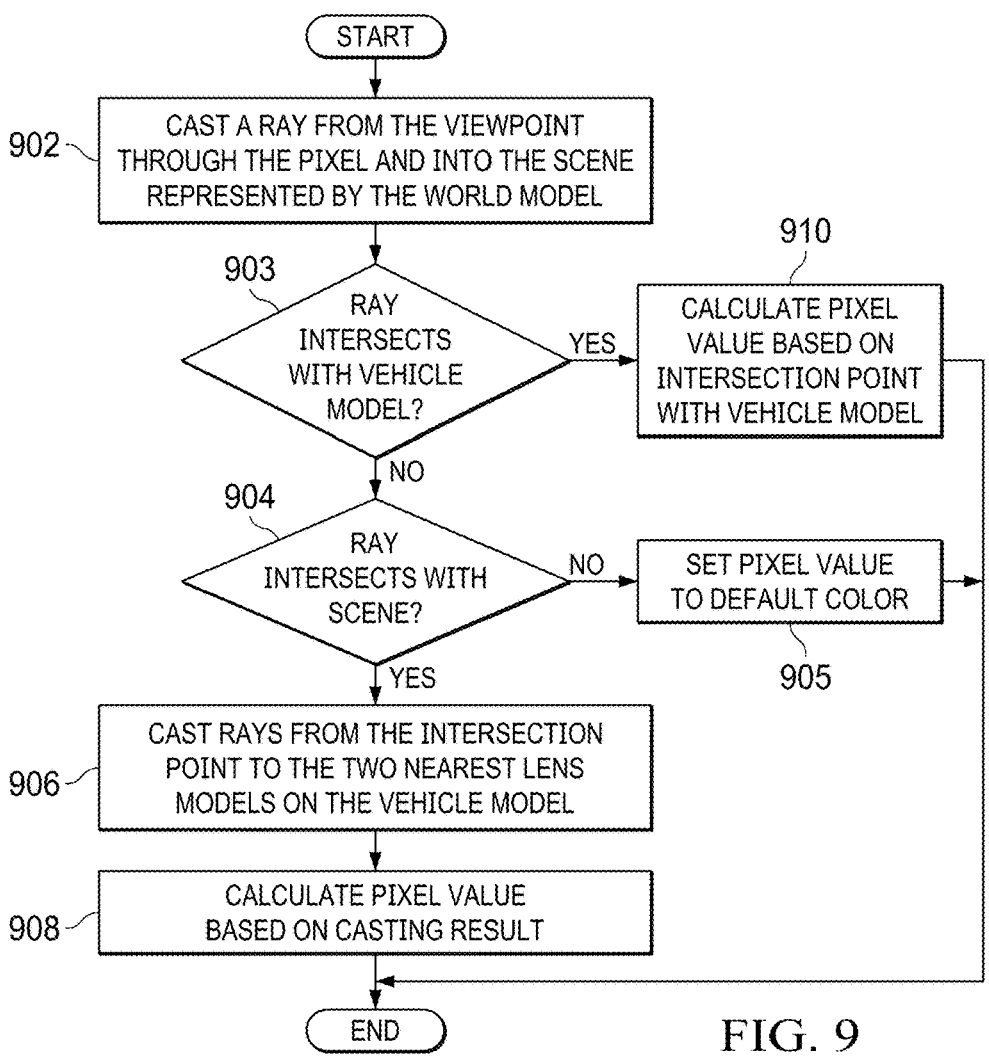
FIG. 9 is a flow diagram of a method for determining the value of a pixel in an SV image using ray tracing.

Initially, corresponding images of each video stream being captured by each camera 202-208 is received 800 by the SV processing system 302. The SV processing system 302 then generates 802 an SV image from the images using ray tracing and displays 804 the resulting SV image in the view port on the display device 218. Ray tracing is used to determine a value for each pixel of the SV image that is to be displayed in the view port. Put another way, ray tracing is used to determine a value for each pixel in the view port. FIG. 9 is a flow diagram of a method for using ray tracing to determine the value of a pixel displayed in the view port. The method is repeated for each pixel in the view port. Portions of the method are illustrated using the example of FIG. 10.

Figure 10:
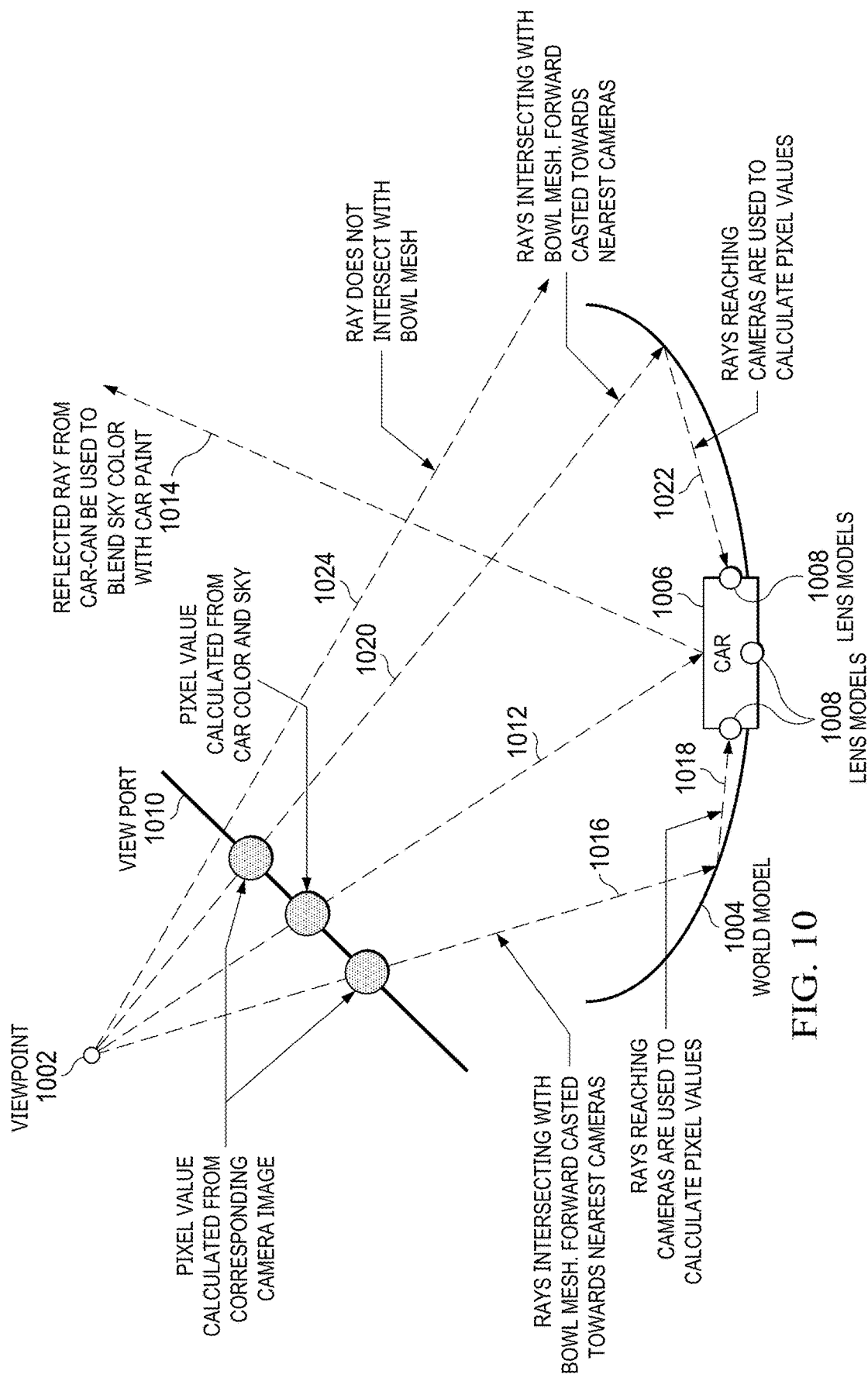
FIG. 10 is an example illustrating determining the value of pixels using ray tracing.

Initially, a ray is cast 902 from the viewpoint through the pixel into the world model representing the scene and the intersection point is calculated. As illustrated in FIG. 10, rays 1012, 1016, 1020, and 1024 are cast from the viewpoint 1002 through pixels of the view port 1010 into the world model 1004.

If the ray intersects 903 with the vehicle model 1006, the pixel value is calculated 910 based on the intersection point with the vehicle model. Any suitable technique can be used to determine the value of the pixel at the intersection point. For example, the value of the pixel at the intersection point in the vehicle model can be used as the pixel value for the SV image. In another example, as illustrated in FIG. 10, the ray 1012 intersects with the vehicle model 1006. A ray 1014 is reflected from the intersection point on the vehicle model and does not intersect with the world model 1004. The reflected ray 1014 "terminates" outside the world model 1004 and is assumed to hit the sky. A color corresponding to a sky color is blended with the pixel color from the intersected pixel on the vehicle model 1006. How the sky color is determined is implementation dependent. The sky color can be assumed to be, for example, a shade of blue during the day and black at night. A reflected ray can also intersect with the world model 1004. In such a case, rays can be cast from the world model intersection point toward the centers of the two lens models having the intersection point in the lens FOV and the pixel values at the lens model intersection points can be blended with the pixel value of the intersected pixel on the vehicle model 1006.

Referring again to FIG. 9, if the ray intersects 904 with the world model or an object in the scene, rays are cast 906 from the intersection point toward the centers of the two lens models positioned around the vehicle model having the intersection point in the lens FOV. In the example of FIG. 10, the ray 1016 and the ray 1020 both intersect with the world model 1004. The rays 1018 are cast from the intersection point of the ray 1016 toward the centers of the two lens models 1008 on the vehicle model 1006 having the intersection point in the lens FOV. The rays 1022 are cast from the intersection of ray 1020 toward the centers of the two lens models 1008 on the vehicle model 1006 having the intersection point in the lens FOV. Note that the rays 1018, 1022 are two rays depicted with a single line for simplicity of illustration.

The pixel value is calculated 908 based on the intersection points(s) of the rays. As previously described, the coordinates of pixels in an image captured by a camera corresponding to a lens model are associated with vertices of the lens model. If a ray directly intersects with a vertex in the lens model, the corresponding image coordinates (u,v) are used to get the pixel value. If a ray passes between vertices, the ray tracing accelerator 310 performs interpolation between u,v values of the closest vertices. Once the vertex of the lens model where a ray intersects is determined, the coordinates of the pixel in the image are known and the value of that pixel can be used to determine the value of the pixel in the SV image/view port.

If both rays reach the respective lens models, the pixel values from the two images are blended to determine the value of the pixel in the SV image/view port. Any suitable approach for blending can be used. For example, a weighted blending can be used in which each pixel in the scene is assumed to be inside an overlap region between two adjacent cameras. For most of the pixels, the blend weights are either 0 or 1 indicating that the entire pixel value is taken from just one camera. For a configurable narrow region from normal in each direction, the blend weights are selected such that there is a smooth transition from 0 to 1 for one camera and from 1 to 0 for the other camera. In the example of FIG. 10, the two rays 1018 intersect with respective lens models 1008 and the pixel value in the SV image/view port is determined by blending the pixel values from the two images of the cameras corresponding to the lens models. Similarly, the two rays 1022 intersect with respective lens models 1008 and the pixel value in the SV image/view port is determined by blending the pixel values from the two images of the cameras corresponding to the lens models.

Referring again to FIG. 9, if only one ray reaches a respective lens model or if neither ray reaches the respective lens model, any suitable technique can be used to determine the pixel value in the SV image/view port. For example, in the former case, the pixel value from the corresponding image can be used as the pixel value in the SV image/view port. In the latter case, the pixel value in the SV image/view port can be treated as being part of a shadow region.

If the originally cast ray does not intersect 904 with the scene, e.g., the ray 1024 in FIG. 10, then the pixel value in the SV image/view port can be determined in any suitable way. For example, the pixel value can be set to black or clear or a background color.

Other Embodiments

While the disclosure has been described with respect to a limited number of embodiments, other embodiments can be devised which do not depart from the scope of the invention as disclosed herein.

For example, embodiments are described herein in which the SV camera system includes four cameras with wide angle lenses. In other embodiments, more or fewer cameras are included in the system.

In another example, embodiments are described herein in which hemispheric lens models are used for the ray tracing. In some embodiments, the lens models can be another suitable geometric shape. Further, in some embodiments, the camera lens can be represented as points. In such embodiments, the calibration process generates lookup tables encoding the camera pixel to lens angle mapping and the table lookup is based on the angle between the incoming ray and the normal of the camera. The ray tracing is performed by software executing on the RTA 310 using the lookup tables. Euclidian algebra can be used to compute the angle between a ray and the normal of the camera given the orientation and location of the camera.

In another example, in some embodiments, the world model can change dynamically based on scene changes and objects appearing and disappearing.

In another example, embodiments have been described herein in reference to automotive SV camera systems. Other embodiments for vehicles other than automobiles that incorporate an SV camera system include, for example, robots, aerial vehicles such as drones, farm equipment such as harvesters, combines, and tractors, warehouse vehicles such as forklifts, water vehicles such as boats and barges, and helmets.

In another example, embodiments are described herein in reference to an example 3D automotive SV system. Using real time ray tracing for lens remapping can be used in other applications that remap camera images to a different viewpoint. For such applications, camera models can be place in a 3D scene at locations corresponding to physical cameras in the world. In some embodiments, geometric models such as the hemispheric models described herein can be generated for each camera lens that map vertices on the lens models to camera image coordinates. In other embodiments, each lens can be represented as a point and lookup tables encoding the camera pixel to lens angle mapping can be generated. To find actual image coordinates, a ray can be cast into the scene and from the scene to the lens models in a similar fashion to that described herein for a 3D automotive SV system.

It is therefore contemplated that the appended claims will cover any such modifications of the embodiments as fall within the true scope of the disclosure.

What is claimed is:

1. A method comprising:
receiving, for each camera of a plurality of cameras, a respective model mapping a set of rays cast through a hemisphere to respective pixels of an image captured by the respective camera; and
determining a surround view image that includes a plurality of surround view image pixels by, for each pixel of the plurality of surround view image pixels:
casting a first respective ray from a viewpoint through a plane corresponding to the surround view image and to a point on a world model;
casting a second respective ray from the point on the world model to a first camera of the plurality of cameras; and
determining a first respective pixel of a first image captured by the first camera by corresponding the second respective ray to a ray of a first model associated with the first camera.

2. The method of claim 1, wherein the determining of the surround view image includes, for each pixel of the plurality of surround view image pixels:
casting a third respective ray from the point on the world model to a second camera of the plurality of cameras;
determining a second respective pixel of a second image captured by the second camera by corresponding the third respective ray to a ray of a second model associated with the second camera; and
determining a value for the pixel of the surround view image based on the first respective pixel of the first image and the second respective pixel of the second image.

3. The method of claim 2, wherein the determining of the surround view image includes, for each pixel of the plurality of surround view image pixels, determining the value of the pixel based on a weighted blend of the first respective pixel and the second respective pixel.

4. The method of claim 1, wherein the world model includes a bowl mesh surrounding a vehicle.

5. The method of claim 1, wherein the plurality of cameras are disposed on a vehicle.

6. The method of claim 5, wherein:
the plurality of surround view image pixels is a first plurality of surround view image pixels;
the surround view image includes a second plurality of surround view image pixels;
the method further comprises determining the surround view image by, for each pixel of the second plurality of surround view image pixels:

casting a third respective ray from the viewpoint through the plane corresponding to the surround view image and to a point on a vehicle model of the vehicle; and determining a value for the respective pixel based on the vehicle model.

7. A system comprising:
at least one processor configured to couple to a set of cameras; and
a non-transitory memory coupled to the at least one processor and configured to store a respective model for each camera of the set of cameras that maps a set of rays through a hemisphere to pixels of an image captured by the respective camera, wherein non-transitory memory stores instructions that, when executed, cause the at least one processor to determine a surround view image that includes a first pixel by:
casting a first ray from a viewpoint through a plane corresponding to the surround view image and to a point on a world model;
casting a second ray from the point on the world model to a first camera of the set of cameras;
determining a first respective pixel of a first image captured by the first camera by corresponding the second ray to a ray of a first model associated with the first camera; and
determining a value of the first pixel of the surround view image based on the first respective pixel of the first image.

8. The system of claim 7, wherein the instructions cause the at least one processor to determine the surround view image by:
casting a third ray from the point on the world model to a second camera of the set of cameras;
determining a second respective pixel of a second image captured by the second camera by corresponding the third ray to a ray of a second model associated with the second camera; and
determining the value of the first pixel of the surround view image based on the second respective pixel of the second image.

9. The system of claim 8, wherein the instructions cause the at least one processor to determine the value of the first pixel based on a weighted blend of the first respective pixel and the second respective pixel.

10. The system of claim 7, wherein the non-transitory memory is configured to store the world model.

11. The system of claim 7, wherein the world model includes a bowl mesh surrounding a vehicle.

12. The system of claim 7 further comprising a display coupled to the at least one processor, wherein the non-transitory memory stores further instructions that cause the at least one processor to provide the surround view image to the display.

13. The system of claim 7, wherein the set of cameras is disposed on a vehicle.

14. The system of claim 13, wherein:
the surround view image further includes a second pixel;
the non-transitory memory is configured to store a vehicle model associated with the vehicle; and
the non-transitory memory stores further instructions that cause the at least one processor to determine the surround view image by:
casting a third ray from the viewpoint through the plane corresponding to the surround view image and to a point on the vehicle model; and
determining a value for the second pixel based on the vehicle model.

15. The system of claim 14, wherein the instructions cause the at least one processor to determine the value for the second pixel by blending a sky color with the vehicle model.

16. The system of claim 7, wherein the at least one processor includes a ray tracing accelerator configured to perform the casting of the first ray and the casting of the second ray.

17. A vehicle comprising:
a set of cameras disposed on the vehicle;
at least one processor coupled to the set of cameras; and
a memory coupled to the at least one processor and configured to store a respective model for each camera of the set of cameras, wherein the at least one processor is configured to determine a surround view image by:
casting a first ray from a viewpoint through a plane corresponding to the surround view image and to a point on a world model;
casting a second ray from the point on the world model to a first camera of the set of cameras; and
determining a first pixel of a first image captured by the first camera by corresponding the second respective ray to a ray of a first model associated with the first camera.

18. The vehicle of claim 17, wherein the at least one processor is further configured to determine the surround view image by:
casting a third ray from the point on the world model to a second camera of the set of cameras;
determining a second pixel of a second image captured by the second camera by corresponding the third respective ray to a ray of a second model associated with the second camera; and
determining a pixel value of the surround view image based on the first pixel of the first image and the second pixel of the second image.

19. The vehicle of claim 17, wherein each respective model of each camera of the set of cameras maps a set of rays through a hemisphere to pixels of an image captured by the respective camera.

20. The vehicle of claim 17, wherein the world model includes a bowl mesh surrounding the vehicle.

* * * * *